US012604897B2

(12) United States Patent
Chen et al.

(10) Patent No.: US 12,604,897 B2
(45) Date of Patent: Apr. 21, 2026

(54) IMINODIPROPIONATE SURFACTANTS FOR AGRICULTURAL USE

(71) Applicant: SPECIALTY OPERATIONS FRANCE, Lyons (FR)

(72) Inventors: Zixian Chen, Singapore (SG); Yuming Zhou, Jiangsu (CN); Zhichao Han, Shanghai (CN); Monique Adamy, Asnières-sur-Seine (FR); Laurianne Moity, Lyons (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 884 days.

(21) Appl. No.: 17/601,241

(22) PCT Filed: Apr. 4, 2019

(86) PCT No.: PCT/CN2019/081441

§ 371 (c)(1),
(2) Date: Oct. 4, 2021

(87) PCT Pub. No.: WO2020/199182

PCT Pub. Date: Oct. 8, 2020

(65) Prior Publication Data

US 2022/0192198 A1 Jun. 23, 2022

(51) Int. Cl.
*A01N 57/20* (2006.01)

(52) U.S. Cl.
CPC .................................... *A01N 57/20* (2013.01)

(58) Field of Classification Search
CPC ................................ A01N 57/20; A01N 25/30
See application file for complete search history.

(56) References Cited

U.S. PATENT DOCUMENTS 3,093,591 A 6/1963 Freese
3,307,931 A 3/1967 Unger et al.

FOREIGN PATENT DOCUMENTS

WO 03092373 A2 11/2003
WO WO-2008069826 A1 * 6/2008 ............. A01N 25/30
WO 2010053385 A1 5/2010
WO WO-2019007393 A1 * 1/2019 ............. A01N 25/02

* cited by examiner

*Primary Examiner* — Michael B. Pallay
(74) *Attorney, Agent, or Firm* — Osha Bergman Watanabe & Burton LLP

(57) ABSTRACT

The present invention relates to a pesticide composition comprising at least: a) an effective amount of a pesticide; b) one anionic surfactant selected from alkyl sulfates, alkyl ether sulfates, alkyl sulfonates, alkyl ether sulfonates, alpha olefin sulfonate, alkyl carboxylates, alkyl ether carboxylates, alkyl sulfosuccinates, alkyl ether sulfosuccinates, glutamates, isethionates, taurates, and sarcosinates; and c) one iminodipropionate.

18 Claims, No Drawings

IMINODIPROPIONATE SURFACTANTS FOR AGRICULTURAL USE

This application is a U.S. national phase entry under 35 U.S.C. § 371 of International Application No. PCT/CN2019/081441, filed on Apr. 4, 2019, the entire content of which is explicitly incorporated herein by this reference.

The present invention relates to pesticide compositions, especially compositions of water-soluble or partially water-soluble pesticides, such as glufosinate salts.

It is common practice to add adjuvants into pesticide compositions. Particularly preferred adjuvants are surfactants, which are very useful in pesticide compositions because they tend to enhance the absorbing properties of the active ingredient, increase the spreading of the active ingredient on weeds, such as on the weed leaves, as well as facilitate application of the pesticide.

Among pesticides, a specific example is with water-soluble or partially water-soluble pesticides, and especially with agrochemicals of the formula (1) or salts thereof, (1)

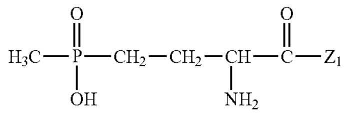

in which:

$Z_1$ is a radical of the formula –OM, —$NHCH(CH_3)CON$—$HCH(CH_3)CO_2M$ or —$NHCH(CH_3)CONHCH[CH_2CH(CH_3)_2]CO_2M$, where M=H or a salt-forming cation.

Those agrochemicals possess a good and broad activity against weeds of many botanical families and they are thus suitable for the non-selective control of undesired plant growth. They are in general taken up by the plant primarily through the leaves and they are usually formulated as aqueous solutions.

Glufosinate-ammonium is a typical example of agrochemicals of the formula (1). Anionic surfactants, such as alkyl ether sulfates, are the most frequently used adjuvants for such agrochemicals.

It is for instance already known from EP0048436, EP00336151 and EP1093722 to use alkyl ether sulfates having alkyl chains length of C12-C16 with 1 to 10 ethyleneoxy units in aqueous formulations of glufosinate-ammonium to enhance the biological action of glufosinate applied to the green parts of plants.

Extensive searches have been carried out to identify potential alternatives to such anionic surfactants (esp. to alkyl ether sulfates) and/or combinations with other additives in order to reduce the overall amount of anionic surfactants (esp. of alkyl ether sulfates) in the formulation and/or to achieve higher loads of active ingredients while maintaining acceptable technical properties (in particular storage stability under varied temperature condition, acceptable viscosity and satisfactory bioefficacy). However most of the additives tested until now negatively impact at least one of these critical attributes.

U.S. Pat. No. 7,842,647 discloses nonetheless the use of alkyl polyglucosides in high load (greater than 20% by weight) glufosinate formulations containing C12-C16 alkyl ether sulfate.

Yet there remain today a need for alternative solutions which allow compositions of agrochemicals, especially compositions of water-soluble or partially water-soluble pesticides, such as glufosinate salts, to be produced which have good technical properties.

This applies especially to concentrate compositions, i.e. to compositions containing high loads of agrochemicals. Concentrate compositions are being sought for the numerous advantages they offer (in particular, less packaging is needed compared to low-concentration formulations, corresponding to reductions in the cost and inconveniences of production, transit, and storage).

Preparing concentrate pesticide compositions remain a challenge today because the biological activity of the pesticide is generally dependent on the proportion of pesticide to surfactant, but if the amount of surfactant is too high, the viscosity of the composition may become too high for easy handling or spraying. Product instability such as phase separation has also been a drawback of highly concentrated formulations. Phase separation is undesirable because the concentration of various essential ingredients is no longer uniform throughout the composition.

For all these reasons, there remain today also a need for alternative solutions which allow concentrate compositions of agrochemicals, especially concentrate compositions of water-soluble or partially water-soluble pesticides, such as glufosinate salts, to be produced which have good technical properties.

It remains a challenge to provide a pesticide composition, notably a glufosinate-containing composition, which has satisfactory bioefficacy. It remains a challenge to provide a pesticide composition, notably a glufosinate-containing composition, which has good stability under varied temperature condition. It remains a challenge to provide a glufosinate containing composition which can be easily formulated.

It remains also a challenge to provide a high-concentration pesticide composition, notably a high-concentration glufosinate-containing composition, that overcomes the drawbacks of the prior art by demonstrating satisfactory, or even enhanced, biological activity in a stable formulation without compromising viscosity requirements.

Therefore, there is a need in the art for stable compositions; in particular, compositions stable at low temperatures, especially at sub-zero temperatures, while maintaining the bio-efficacy of the formulations.

SUMMARY OF THE INVENTION

The present invention provides a pesticide composition comprising at least:

a) an effective amount of a pesticide;

b) one anionic surfactant selected from alkyl sulfates, alkyl ether sulfates, alkyl sulfonates, alkyl ether sulfonates, alpha olefin sulfonate, alkyl carboxylates, alkyl ether carboxylates, alkyl sulfosuccinates, alkyl ether sulfosuccinates, glutamates, isethionates, taurates, and sarcosinates, especially alkyl ether sulfates; and c) one iminodipropionate.

The present invention also provides a method of enhancing the efficacy of a pesticide composition comprising at least one pesticide, said method comprising adding at least one iminodipropionate to a pesticide composition containing an effective amount of a pesticide and one anionic surfactant selected from alkyl sulfates, alkyl ether sulfates, alkyl sulfonates, alkyl ether sulfonates, alpha olefin sulfonate, alkyl carboxylates, alkyl ether carboxylates, alkyl sulfosuccinates, alkyl ether sulfosuccinates, glutamates, isethionates, taurates, and sarcosinates, especially alkyl ether sulfates.

The pesticide compositions of the invention advantageously exhibit at least one of the following properties:

a) acceptable storage stability, especially low-temperature stability and/or b) acceptable pesticidal action, especially compared with prior art formulations, due to the good bioefficacy enhancing property of the iminodipropionate of the invention, and/or c) acceptable viscosity, and/or d) a low tendency to foam.

The pesticide compositions of the invention demonstrate advantageously excellent stability at low temperature and are bioefficacious.

Advantageously, the pesticide compositions of the invention are stable at temperatures below 0° C. even with high loading of pesticide and/or adjuvant.

By virtue of their surfactant properties, it is hypothesized that the iminodipropionate of the invention promote the uptake of the pesticide into the plant, in particular the uptake via the leaves of the plant, and thus contribute to improving the activity of the pesticide. Surprisingly, the surfactant properties of the iminodipropionate used according to the invention lead to favorable activity improvements, especially when used in combination with an anionic surfactant as defined previously, especially an alkyl ether sulfate.

The formulations of the invention also display a very good biological action by comparison with known formulations comprising for instance alkyl ether sulfate alone or prior art formulations containing combinations of alkyl ether sulfate and alkyl polyglucosides.

The concentrate pesticide compositions and resulting aqueous pesticide formulations obtained upon dilution in water also show advantageously a reduced tendency to foam. The liquid formulations of the invention are low-foam formulations with good storage properties.

Accordingly the formulations of the invention are especially suitable for use in crop protection where the formulations are applied, if appropriate after dilution with water, to the plants, to parts of plants or to the area under cultivation.

DETAILED DESCRIPTION

Throughout the description, including the claims, the term "comprising one" or "comprising a" should be understood as being synonymous with the term "comprising at least one", unless otherwise specified. The terms "between" and "from . . . to . . . " should be understood as being inclusive of the limits.

The articles "a", "an" and "the" are used to refer to one or to more than one (i.e., to at least one) of the grammatical object of the article.

It should be noted that in specifying any range of concentration, weight ratio or amount, any particular upper concentration, weight ratio or amount can be associated with any particular lower concentration, weight ratio or amount, respectively.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "alkenyl" as a group or part of a group denotes an aliphatic hydrocarbon group containing at least one carbon-carbon double bond and which may be straight or branched. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

As used herein, the term "hydroxyalkyl" means an alkyl radical, which is substituted with one or more hydroxyl groups, such as hydroxymethyl, hydroxyethyl, hydroxypropyl, and hydroxydecyl.

As used herein, the term "hydroxyalkenyl" means an alkenyl radical, which is substituted with one or more hydroxyl groups.

As used herein, the terminology "(Cn-Cm)" in reference to an organic group, wherein n and m are each integers, indicates that the group may contain from n carbon atoms to m carbon atoms per group.

As used herein, "pbw" means in each case "percent by weight", i.e. the ratio of the weight of the component (active material) and the weight of the preparation in percent.

As used herein, "low temperature" refers to temperature below 10° C., preferably it is below 5° C. and more preferably it is 0° C. and below 0° C.

The term "good storage stability" is intended to denote compositions which remain homogeneous (i.e. which exhibit substantially no phase separation (sedimentation, syneresis, etc)) and non-hazy over time, in particular which remain substantially homogeneous and non-hazy when they are stored for at least one week at −5° C. (standardized CIPAC tests MT 39.3).

The term "easy to handle" or "flowable" is intended to denote compositions of suitable viscosity for example less than 2000 cP, or more preferably less than 1000 cP measured at 20 rpm and at the considered temperature according to the standardized CIPAC test MT 192. Flowability can also be checked visually: when the sample is turned upside down, the liquid is flowing without resistance.

Pesticide

The pesticide composition of the invention comprises an effective amount of at least one pesticide.

As used herein, the term "effective amount" in reference to the relative amount of a pesticide in a pesticide composition means the relative amount that is effective to control growth of a target plant when the pesticide composition is applied to the target plant at a given application rate.

According to anyone of the invention embodiments, the pesticide composition comprises an effective amount of at least one water-soluble or partially water-soluble pesticide.

Suitable pesticides are generally those which, during preparation of aqueous pesticide formulations, are fully or partially dissolved in the aqueous phase, generally dissolved by 5 to 100 percent by weight, preferably by 10 to 90 percent by weight, more preferably by 20 to 80 percent by weight, based on the weight of the active ingredient in the aqueous pesticide formulation, preferably at the active ingredient concentrations customary in practice.

Examples of such active ingredients are salt-like (salt-containing) water-soluble active ingredients such as glufosinate (salts), glyphosate (salts), paraquat, diquat and the like, especially glufosinate-ammonium.

Preference is given here to agrochemicals, especially pesticides, having a solubility in water of more than 10 mg of active ingredient per liter of water, preferably more than 20 mg/I, in particular more than 30 mg/I, at room temperature.

According to anyone of the invention embodiments, the pesticide comprises one or more agrochemicals of the formula (1) or salts thereof:

(1)

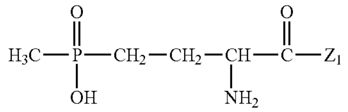

in which:

$Z_1$ is a radical of the formula –OM, —$NHCH(CH_3)CONHCH(CH_3)CO_2M$ or —$NHCH(CH_3)CONHCH[CH_2CH(CH_3)_2]CO_2M$, where M=H or a salt-forming cation.

The compounds of the formula (1) include an asymmetric carbon atom. The L enantiomer is regarded as the biologically active isomer. The formula (1) hence embraces all stereoisomers and mixtures thereof, particularly the racemate and the biologically active enantiomer in each case.

Examples of active ingredients of the formula (1) are as follows:

glufosinate and its salts in racemic form, i.e., 2-amino-4-[hydroxy(methyl)phosphinoyl]butanoic acid and its salts, such as the ammonium salt or the sodium salt, the L enantiomer of glufosinate and its salts, such as the ammonium salt or the sodium salt, bilanafos/bialaphos, i.e., L-2-amino-4-[hydroxy(methyl)phosphinoyl]butanoyl-L-alaninyl-L-alanine and its sodium salt.

According to anyone of the invention embodiments, the pesticide composition of the invention may preferably comprise an ammonium salt of glufosinate.

Also suitable as pesticide of the invention are combinations of appropriate active ingredients, such as herbicides, insecticides and fungicides, and, if desired, fertilizers.

A composition of the invention may thus comprise, in addition to the pesticide of the invention (and especially in addition to the water-soluble or partially water-soluble pesticide, such as glufosinate salt) one or more other agrochemicals, especially one or more other active ingredients.

According to anyone of the invention embodiments, the pesticide may be present in a composition of the invention in an amount of from 1 to 90 pbw, for instance from 1 to 50 pbw, preferably from 10 to 50 pbw, for instance from 15 to 50 pbw, more preferably from 20 to 50 pbw, relative to the total weight of the composition.

Advantageously the presence of iminodipropionate in the pesticide composition of the invention allows the preparation of stable, high load, concentrated pesticide formulations.

According to a preferred invention embodiment, the pesticide may thus be present in a composition of the invention in an amount of at least 20 pbw, for instance from 20 to 50 pbw, for instance from 20 to 40 pbw, especially from 22 to 30 pbw, relative to the total weight of the composition The pesticide compositions of the invention are generally concentrate formulations containing high loads of pesticide. Therefore the concentration provided previously may of course be lowered correspondingly by dilution prior to application.

The concentrations given previously for the pesticide in the pesticide composition are the concentrations in active ingredients.

Anionic Surfactant

The pesticide composition of the invention comprises at least one anionic surfactant.

Anionic surfactants are generally known and include, for example, alkaryl sulfonate surfactants, alpha olefin sulfonate surfactants, paraffin sulfonate surfactants, alkyl sulfonate surfactants, alkyl ether sulfonate surfactants, alkyl sulfate surfactants, alkyl ether sulfate surfactants, alkyl carboxylate surfactants, alkyl ether carboxylate surfactants, monoalkyl phosphate surfactants, monoalkyl ether phosphate surfactants, dialkyl phosphate surfactants, dialkyl ether phosphate surfactants, alkyl sulfosuccinate surfactants, alkyl ether sulfosuccinate surfactants, glutamate surfactants, isethionate surfactants, taurate surfactants, and sarcosinate surfactants, including salts of and mixtures of such compounds.

In one embodiment, the cationic counterion of an anionic surfactant in salt form is typically selected from sodium, potassium, lithium, calcium, magnesium, ammonium, ($C_1$-$C_6$)alkyl ammonium cations.

Suitable alkyaryl sulfonate surfactants, alkyl sulfonate surfactants, alkyl ether sulfonate surfactants, alpha olefin sulfonate surfactants, paraffin sulfonate surfactants, and alkenyl sulfonate surfactants include, for example, calcium dodecylbenzene sulfonate, sodium octadecylphenyl sulfonate, isopropylamine dodecyl benzene sulfonate, sodium xylene sulfonate, sodium (C14-C16)alpha olefin sulfonate, sodium tridecyl benzene sulfonate, and sodium dodecyl benzene sulfonate, disodium alkyldiphenyloxide disulfonates.

Suitable alkyl sulfate surfactants and alkyl ether sulfate surfactants include, for example, sodium lauryl sulfate, ammonium lauryl sulfate, ammonium laureth sulfate, triethanolamine laureth sulfate, monoethanolamine laureth sulfate, diethanolamine lauryl sulfate, diethanolamine laureth sulfate, lauric monoglyceride sodium sulfate, sodium laureth sulfate, potassium lauryl sulfate, potassium laureth sulfate, sodium trideceth sulfate, and ammonium tridecyl sulfate Suitable alkyl sulfosuccinate surfactants and alkyl ether sulfosuccinate surfactants include, for example, disodium laureth sulfosuccinate.

Suitable monoalkyl phosphate surfactants, monoalkyl ether phosphate surfactants, dialkyl phosphate surfactants, dialkyl ether phosphate surfactants include, for example, sodium monoalkyl phosphate, sodium dialkyl phosphate, alkoxylated tristyrylphenol phosphates.

Suitable alkyl ether carboxylate surfactants include for example, sodium laureth carboxylate.

Suitable glutamate surfactants, isethionate surfactants, taurate surfactants, and sarcosinate surfactants include, for example, sodium lauroyl isethionate, potassium methyl myristyl taurate, ammonium oleoyl sarcosinate.

In one embodiment, the pesticide composition of the invention comprises at least one anionic surfactants selected from alkyl sulfates, alkyl ether sulfates, alkyl sulfonates, alkyl ether sulfonates, alpha olefin sulfonate, alkyl carboxylates, alkyl ether carboxylates, alkyl sulfosuccinates, alkyl ether sulfosuccinates, glutamates, isethionates, taurates, and sarcosinates.

In a preferred embodiment, the pesticide composition of the invention comprises at least one anionic surfactants selected from alkyl sulfates, alkyl ether sulfates, alkyl sulfonates, alkyl ether sulfonates, alpha olefin sulfonate, alkyl carboxylates, alkyl ether carboxylates, glutamates, isethionates, taurates, and sarcosinates.

In an even preferred embodiment, the pesticide composition of the invention comprises at least one anionic surfactants selected from alkyl sulfates, alkyl ether sulfates, alkyl sulfonates, alkyl ether sulfonates and alpha olefin sulfonate.

According to a preferred invention embodiment, the pesticide composition of the invention comprises at least one alkyl ether sulfate.

Alkyl ether sulfates are generally defined as salts of sulfated adducts of ethylene and/or propylene oxide with fatty alcohols containing from 8 to 30 carbon atoms.

According to anyone of the invention embodiments, the pesticide composition of the invention may comprise at least one alkyl ether sulfate of formula (3):

$$R'\text{-}[O—CH(R'')—CH_2]_m—O—S(O)_3^-X^+ \quad (3)$$

wherein:

- R' is an alkyl, for instance a $(C_8\text{-}C_{30})$alkyl, more typically a $(C_8\text{-}C_{18})$ alkyl, for instance lauryl,
- each R'' is independently H or methyl, and more typically is H,
- m is an integer from 1 to 100, for instance from 1 to 50, and more typically from 1 to 10, and
- $X^+$ is an agronomically acceptable cation, such as sodium.

According to anyone of the invention embodiments, the alkyl ether sulfates, used in the composition of the present invention may be commercially available and may contain a linear aliphatic group having from 8 to 16 carbon atoms, usually from 12 to 16 carbon atoms.

The degree of ethoxylation may be from 1 to 10 moles of ethylene oxide, usually 2 to 4 moles of ethylene oxide.

Suitable alkyl ether sulfate surfactant compounds include especially sodium $(C_8\text{-}C_{10})$alkyl ether sulfate.

Other suitable alkyl ether sulfate surfactant compounds include sodium lauryl ether sulfate, ammonium lauryl ether sulfate, and other salts of lauryl ether sulfate.

According to anyone of the invention embodiments, the composition of the invention may preferably comprise sodium lauryl ether sulfate.

Mention may be made especially of sodium lauryl ether sulfate supplied as an approximate 70% active solution, derived either from vegetable or petroleum sources.

According to anyone of the invention embodiments, the composition of the invention may preferably comprise from 3 to 35 pbw, preferably from 10 to 30 pbw, of said anionic surfactant, for instance alkyl ether sulfate, preferably sodium lauryl ether sulfate, relative to the total weight of the composition.

According to anyone of the invention embodiments, the composition of the invention may preferably comprise less than 50 pbw, preferably less than 35 pbw, for instance less than 20 pbw, for instance less 18 pbw of said anionic surfactant, for instance alkyl ether sulfate, preferably sodium lauryl ether sulfate, relative to the total weight of the composition.

As mentioned previously, the pesticide compositions of the invention maybe concentrate formulations containing high loads of pesticide and thus of anionic surfactant, for instance alkyl ether sulfate. Therefore the concentration provided previously may of course be lowered correspondingly by dilution prior to application.

According to another embodiment, a composition of the invention may additionally or alternatively comprise at least one alkyl ether sulfate having 1 to 9 carbon atoms in the alkyl chain and 1 to 20 alkyleneoxy units, preferably 1 to 12 alkyleneoxy units, in the ether moiety, the term alkyl ether sulfates referring to compounds from the group of the $(C_1\text{-}C_9)$alkyl (poly)glycol ether sulfates, generally having a terminal sulfate group.

Typical examples of such alkyl ether sulfate include butyl (poly)glycol ether sulfate, pentyl (poly)glycol ether sulfate, hexyl (poly)glycol ether sulfate, heptyl (poly)glycol ether sulfate, octyl (poly)glycol ether sulfate, and nonyl (poly) glycol ether sulfate, each containing (poly)glycol ether moieties of 1 to 20 alkylene glycol units, preferably of 1 to 10 ethyleneoxy units (more specifically 1,2-ethyleneoxy units), such as those disclosed in U.S. Pat. No. 8,637,432 incorporated herein by reference.

Iminodipropionate Surfactant

The pesticide composition of the invention comprises at least one iminodipropionate.

According to anyone of the invention embodiments, the pesticide composition of the invention may comprise at least one iminodipropionate of formula (2):

$$R—N—(CH_2CH_2COOY)_2 \quad (2)$$

wherein:

- R is a $C_6\text{-}C_{22}$ alkyl, alkenyl, hydroxyalkyl or hydroxyalkenyl and
- Y is an agronomically acceptable cation, such as sodium.

Examples of iminodipropionate suitable according to the present invention include sodium cociminodipropionate (such as the product available from Solvay under the tradename MACKAM® DP-122) and sodium 2-ethylhexyliminodipropionate (such as the products available from Solvay under the tradename MACKAM® OIP-40 and Mackam ODP-45M).

According to anyone of the invention embodiments, the pesticide composition of the invention comprises sodium cociminodipropionate or sodium 2-ethylhexyliminodipropionate, and preferably sodium 2-ethylhexyliminodipropionate.

According to anyone of the invention embodiments, the pesticide composition of the invention may preferably comprise from 1 to 50 pbw, preferably from 2 to 40 pbw, for instance from 5 to 30 pbw of iminodipropionate, relative to the total weight of the composition.

As mentioned previously, the pesticide compositions of the invention may be concentrate formulations containing high loads of pesticide and thus of iminodipropionate. Therefore the concentration provided previously may of course be lowered correspondingly by dilution prior to application.

According to anyone of the invention embodiments, the pesticide composition of the invention further comprises a liquid carrier.

The liquid formulations of the invention can be prepared by methods which are customary in principle, i.e., by mixing the components with stirring or shaking or by means of static mixing methods.

While the liquid pesticide compositions of the present invention may be waterborne or solventborne, they are more often waterborne (aqueous).

According to anyone of the invention embodiments, the pesticide composition of the invention may further comprise water. Preference is given to aqueous, liquid, concentrated, storage-stable formulations. Ready-to-use, aqueous pesticide formulations are also to be considered as formulations according to the invention.

According to anyone of the invention embodiments, the pesticide composition of the invention may comprise at least 20 pbw, for instance from 25 to 70 pbw, for instance from 30 to 65 pbw of water, relative to the total weight of the composition.

According to anyone of the invention embodiments, the weight ratio of said pesticide to said anionic surfactant, for instance to said alkyl ether sulfate, is in the range from 1:0.1 to 1:5, for instance from 1:0.5 to 1:3.

According to anyone of the invention embodiments, the weight ratio of said pesticide to said iminodipropionate is in the range from 1:0.05 to 1:5, for instance from 1:0.05 to 1:3.

According to anyone of the invention embodiments, the weight ratio of said anionic surfactant, for instance of said alkyl ether sulfate, to said iminodipropionate is in the range from 95:5 to 10:90, for instance from 90:10 to 20:80.

While not intending to be bound by theory, it has been observed that keeping the ratios of the various ingredients within these ranges enhances the biological activity of the pesticide compared to when it is used alone, without compromising the stability of the composition. Moreover, the viscosity of the composition may be maintained within a desired range.

Unlike concentrated pesticide compositions of the prior art, the composition of the present invention is both stable, flowable and sprayable over a wide temperature range.

An important criterion for the storage stability of liquid pesticide compositions, such as glufosinate formulations for example, is the phase stability.

With respect to the present invention, the term "stable" as used herein is intended to refer to physically stable compositions; i. e., liquid compositions that exist in a substantially continuous, single phase.

A preparation is considered sufficiently phase-stable when it remains homogenous over a wide temperature range and there is no development of two or more separate phases and no precipitation (formation of a further, solid phase).

Phase stability is the critical requirement for a storage-stable formulation not only at elevated temperature, as may occur, for example, during storage in the sun or in hot countries, but also at low temperature, as in the winter or in cold climatic regions, for example.

The pesticide composition of the invention is advantageously stable, occurring in a substantially continuous, single phase both at elevated temperatures, preferably at temperatures greater than 45° C., and at low temperatures, preferably at temperatures of less than 10° C., more preferably of less than 0° C. and especially preferably of less than −5° C.

Typically, CIPAC Tests (MT46.3 for accelerated storage and MT39.3 for cold storage) can be carried out.

The pesticide composition of the invention is advantageously pourable.

According to anyone of the invention embodiments, the pesticide composition of the invention has a viscosity of no more than 2000 cps at temperatures as low as 0° C.

The viscosity of the composition is typically no more than 2000 cps, often no more than 1500 cps, more often no more than 1000 cps, at temperatures as low as 0° C. Viscosity may be measured using any technique known to those skilled in the art, for example, using a Brookfield Synchro-lectric Model LVT Viscometer.

An apparent viscosity is measured by first stirring the sample with a glass rod for 10 seconds, placing the sample on the instrument, turning the instrument on, and measuring the value after 3 revolutions of the measuring dial. Typically the measurement is made using a #3 spindle rotating at 30 RPMs; however depending upon the viscosity of the sample, different spindles and differing rotational speeds can be utilized, as known by those skilled in the art.

The pesticide composition of the invention also shows advantageously a reduced tendency to foam.

The pesticide compositions of the invention are advantageously stable, pourable and low-foam compositions with good storage properties, especially at low temperatures.

Typically, CIPAC Test (MT47.3) can be carried out.

The pH of the pesticide compositions is situated customarily in the range from 3.5 to 8.0, being preferably 4.0 to 8.0 and more preferably 5 to 8.

The pH is determined primarily by the pH values of the solutions of the aqueous pesticides present in the form of salts of weak acids. By adding acids, bases or buffer salts, the pH may be adjusted to a different value in deviation from the original pH of the mixture.

Typically, CIPAC Tests (MT75.3) can be carried out.

According to anyone of the invention embodiments, a composition of the invention may optionally further comprise other customary formulation auxiliaries, such as solvents, inert materials, such as tackifiers, wetting agents, dispersants, emulsifiers, penetrants, preservatives, fillers, carriers and colorants, antifreeze agents and evaporation inhibitors (such as glycerol or ethylene glycol), and pH-(buffer, acids and bases) or viscosity-modifying agents (for example thickeners) and antifoams. A composition of the invention may also optionally further include drift control agents.

Mention may be made especially of polar organic solvents, such as for instance:

aliphatic alcohols, such as, for example, lower alkanols, such as methanol, ethanol, propanol, isopropanol and butanol, or polyhydric alcohols, such as ethylene glycol, glycerol, polar ethers, such as tetrahydrofuran (THF), dioxane, alkylene glycol monoalkyl ethers and alkylene glycol dialkyl ethers, such as, for example, propylene glycol monomethyl ether, propylene glycol monoethyl ether, ethylene glycol monomethyl ether or ethylene glycol monoethyl ether, diglyme and tetraglyme;

amides, such as dimethylformamide (DMF), dimethylacetamide, dimethylcaprylamide, dimethylcaprinamide ((R) Hallcomide) and N-alkylpyrrolidones;

ketones, such as acetone;

esters based on glycerol and carboxylic acids, such as glycerol mono-, di- and triacetate, lactames, lactate esters having chain lengths of 1 to 10 carbon atoms in the ester moiety, carbonic diesters;

nitriles, such as acetonitrile, propionitrile, butyronitrile and benzonitrile; sulfoxides and sulfones, such as dimethyl sulfoxide (DMSO) and sulfolane.

According to anyone of the invention embodiments, a composition of the invention preferably further contains fully or largely water-miscible solvents or solvent mixtures.

In the case of single-phase, aqueous-organic solutions, solvents or solvent mixtures which are completely or largely water-miscible are suitable.

Typical organic solvents include polar organic solvents, such as alkylene glycol monoalkyl and dialkyl ethers, such as propylene glycol monomethyl ether, propylene glycol monoethyl ether, ethylene glycol monomethyl and monoethyl ether.

According to anyone of the invention embodiments, a composition of the invention may further comprise a polar organic solvent, for instance an alkylene glycol monoalkyl and dialkyl ether as described previously, for instance in an amount of at least 0.5 pbw, for instance of at least 1 pbw, for instance from 1 to 20 pbw, for instance from 1 to 10 pbw, relative to the total weight of the formulation.

According to anyone of the invention embodiments, the pesticide composition of the invention may comprise less than 30 pbw, for instance less than 25 pbw, for instance less than 20 pbw, of any additional surfactant, relative to the total weight of the composition.

The iminodipropionate of the present invention can be used as a tank-mix additive or formulated in an in-can formulation.

According to one of the invention embodiments, the present invention thus provides liquid adjuvant formulations containing at least one iminodipropionate of the invention, which can be used for preparing concentrated in-can pesticide formulations.

According to another one of the invention embodiments, the present invention provides liquid adjuvant formulations containing at least one iminodipropionate of the invention, which can be used for preparing tank mixes with pesticides, or else may be applied separately, simultaneously or sequentially with the application of pesticides to the plants or to the soil on or in which the plants are growing.

According to one of the invention embodiments, the present invention relates to a method of enhancing the efficacy of a composition comprising at least one pesticide, said method comprising adding to said pesticide composition at least one iminodipropionate as described previously The present invention also provides the use of the iminodipropionate as described previously, preferably in combination with other anionic surfactants such as especially an alkyl ether sulfate as described previously, as additive for enhancing the activity of agrochemicals, preferably water-soluble or partially water-soluble pesticides, preferably glufosinate salts.

The present invention also provides the use of the iminodipropionate as described previously as additive for enhancing the activity of agrochemicals, preferably water-soluble or partially water-soluble pesticides, preferably glufosinate salts, in a composition containing less than 20 pbw of sulfosuccinate, for instance less than 15 pbw, for instance less than 10 pbw, for instance less than 5 pbw, for instance less than 2 pbw, for instance less than 1 pbw, for instance substantially 0 pbw, of sulfosuccinate relative to the total weight of the composition.

It is mentioned that according to another one of the invention embodiments is also covered the use of iminodipropionate as described previously for enhancing the activity of other agrochemicals, for instance fertilizers, and especially partially water-soluble fertilizers, preferably foliar fertilizers (fertilizers which are taken up by the leaves of the plants), such as urea or foliar macro- or microelement fertilizer, including chelates.

The invention is further described by the following non-limiting examples which further illustrate the invention, and are not intended, nor should they be interpreted to, limit the scope of the invention.

In the examples below, the stated amounts are based on weight (pbw=parts by weight), unless indicated otherwise.

EXAMPLES

Materials

GLUFOSINATE Tech: glufosinate ammonium, 2-amino-4-(hydroxymethylphosphinyl)butanoic acid monoammonium salt in powder form, active content ingredient 97.5 pbw, from YongNong BioSciences CO., LTD.

GLUFOSINATE SL: glufosinate ammonium, 2-amino-4-(hydroxymethylphosphinyl)butanoic acid monoammonium salt, active content ingredient 50 pbw, prepared from GLUFOSINATE Tech above.

MACKAM® 01P-40: sodium 2-ethylhexyliminodipropionate, solids content 39.9 pbw, from Solvay.

AgRHO® FKC1000: Betaine surfactant, active content 30 pbw, from Solvay.

TRITON CG110: Alkyl polyglucoside, active content 58.7 pbw, from Sigma-Aldrich.

APG0810: Caprylyl/Capryl Glucoside, active content ingredient 50 pbw, from Yangzhou Chenhua New Material Co., Ltd.

Rhodapex® ESB N70KT: Sodium Lauryl Ether Sulfate, active content 70 pbw, from Solvay.

Dowanol PM: 1-Methoxy-2-propanol, from Sigma-Aldrich.

DPM: Di(propylene glycol) methyl ether, mixture of isomers, from Sigma-Aldrich

Example 1—Stability Tests (Cold Storage)

Glufosinate compositions were prepared according to the formulations in upper panel of Tables 1-3 below ("S" means Sample, "CS" means Comparative Sample). The GLUFOSINATE SL (glufosinate ammonium salt base solution, 50 wt %) was mixed (magnetic stirring, 60 ml glass container with stopper) with surfactants, Dowanol PM and water to obtain the final compositions (20 g of each final compositions).

Stability of the compositions was tested under −5° C. The appearance and pourability of the compositions were visually observed after one week (−5° C.). Results are shown in lower panel of Tables 1-3.

TABLE 1

| | CS1 | CS2 | CS3 | CS4 | CS5 | CS6 |
|---|---|---|---|---|---|---|
| FORMULATION (wt % as is) | | | | | | |
| GLUFOSINATE SL | 48.91 | 48.88 | 48.98 | 48.94 | 49.13 | 48.81 |
| Rhodapex ® ESB N70KT | 31.69 | 31.51 | 31.73 | 31.70 | 31.63 | 31.58 |
| Dowanol PM | 1.08 | 1.07 | 0.97 | 1.02 | 0.98 | 1.06 |
| Water | balance | balance | balance | balance | balance | balance |
| TRITON CG110 | 0.0 | 3.49 | 5.07 | 6.72 | 10.52 | 12.77 |
| STABILITY & POURABILITY @−5° C. | | | | | | |
| −5° C. | Hazy flowable | Hazy Not flowable | Hazy Not flowable | Hazy Not flowable | Hazy Very difficult to flow | Hazy Very difficult to flow |

TABLE 2

| | CS7 | CS8 | CS9 |
|---|---|---|---|
| GLUFOSINATE SL | 49.00 | 48.89 | 48.84 |
| Rhodapex ® ESB N70KT | 31.67 | 31.66 | 31.72 |
| Dowanol PM | 1.00 | 0.98 | 1.04 |
| Water | balance | balance | balance |
| AgRHO ® FKC1000 | 6.65 | 10.06 | 13.24 |
| STABILITY & POURABILITY @-5° C. | | | |
| −5° C. | Bottom layer, hazy Very difficult to flow | Bottom layer, hazy Very difficult to flow | Bottom layer, hazy Very difficult to flow |

TABLE 3

| | S1 | S2 | S3 | S4 | S5 |
|---|---|---|---|---|---|
| FORMULATION (wt % as is) | | | | | |
| GLUFOSINATE SL | 49.01 | 48.99 | 49.02 | 48.91 | 48.79 |
| Rhodapex ® ESB N70KT | 31.58 | 31.62 | 31.63 | 31.45 | 31.67 |
| MACKAM ® OIP-40 | 5.05 | 7.50 | 9.95 | 15.55 | 18.47 |
| Dowanol PM | 1.01 | 1.08 | 1.01 | 1.1 | 1.07 |
| Water | balance | balance | balance | balance | balance |
| STABILITY & POURABILITY @-5° C. | | | | | |
| −5° C. | Transparent Easy to flow | Transparent Easy to flow | Transparent Easy to flow | Transparent Easy to flow | Transparent Easy to flow |

Results showed that the inventive compositions exhibit good storage stability and are flowable under cold conditions. In contrast, the compositions containing Alkypolyglucoside (CS2-CS6) are hazy and difficult to flow under cold conditions. Composition with Sodium Lauryl Ether Sulfate without additional surfactants (CS1) is hazy under cold conditions. Also, the compositions containing a betaine (CS7-CS9) exhibited poor stability under low temperature (phase separation and very difficult to flow).

Example 2—Viscosity and Stability Tests

Glufosinate compositions were prepared according the process in Example 1. Stability of the compositions was tested under different temperature.

The appearance and pourability of the compositions were visually observed after one week (−5° C. and −10° C.).

Viscosity has been measured using a BROOKFIELD viscometer, Model: RVDV-II+, spindle #3 measured at 100 rpm, at 20° C.

Results are shown in lower panel of Table 4.

TABLE 4

| | CS10 | S6 |
|---|---|---|
| FORMULATION (wt % as is) | | |
| GLUFOSINATE SL | 48.9 | 48.9 |
| Rhodapex ® ESB N70KT | 22.0 | 22 |
| APG0810 | 12.4 | 0 |
| MACKAM ® OIP-40 | 0 | 15.5 |
| Dowanol PM | 2.0 | 2.0 |
| Water | balance | balance |
| STABILITY & POURABILITY | | |
| Viscosity (20° C., 100 rpm, 3#) | 380 | 120 |
| 20° C. appearance | Transparent Easy to flow | Transparent Easy to flow |
| 54° C. 2 weeks storage | Transparent Easy to flow | Transparent Easy to flow |
| 0° C., 1 week storage | Transparent Easy to flow | Transparent Easy to flow |
| −5° C. 1 week storage | Transparent Easy to flow | Transparent Easy to flow |
| −10° C. 1 week storage | Transparent Easy to flow | Transparent Easy to flow |

Results showed that the inventive composition (S6) exhibit good storage stability and low viscosity. In contrast, the compositions containing Alkypolyglucoside (CS10) has much higher viscosity at 20° C.

Example 3—Efficacy Tests

Glufosinate compositions were prepared according to the formulations in upper panel of Tables 4.

Efficacy of the formulations was tested on *Digitaria sanguinalis* (L.) Scop. The plants were cultured under room temperature (25-35° C.) and sprayed with the glufosinate formuations when the plants reached 3-leaves stage. The dosage of the glufosinate formulation was 140 g a.i./Ha. A group of untreated plants was used as control.

For evaluation of herbicidal efficacy, all plants tested were examined by a skilled technician, who recorded percentage of inhibition, a visual measurement of the effectiveness of each treatment group (in triplicate) by comparison with the control group (untreated plants, in triplicate). Inhibition of 0% indicates no killing effect, and inhibition of 100% indicates that all of the plants are completely dead.

Results are shown below:

| Formulation | Rate g a.i./ha | Inhibition % 4 DAT | 11 DAT | 20 DAT |
|---|---|---|---|---|
| CS10 | 140 | 74 | 87 | 92 |
| S6 | 140 | 75 | 90 | 95 |

Results showed that the inventive composition (S6) provides satisfactory, and even improved, bio-efficacy compared to a composition containing Alkypolyglucoside (CS10).

The invention claimed is:

1. A pesticide composition comprising at least:

a) an effective amount of a pesticide, wherein said pesticide comprises one or more agrochemicals of the formula (1) or salts thereof:

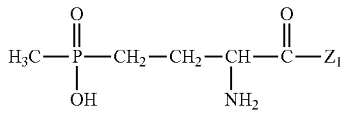

(1)

in which:

$Z_1$ is a radical of the formula —OM, —NHCH($CH_3$)CONHCH($CH_3$)$CO_2$M or —NHCH($CH_3$)CONHCH[$CH_2$CH($CH_3$)$_2$]$CO_2$M, where M═H or a salt-forming cation;

b) from 3 to 35 pbw, relative to the total weight of the composition, of at least one alkyl ether sulfate surfactant; and c) from 1 to 50 pbw, relative to the total weight of the composition, of one iminodipropionate wherein the composition is substantially free of sulfosuccinates.

2. The pesticide composition of claim 1, wherein said pesticide is a water-soluble or partially water-soluble pesticide.

3. The pesticide composition of claim 1, comprising at least 20 pbw of said pesticide, relative to the total weight of the composition.

4. The pesticide composition of claim 1, comprising one iminodipropionate of formula (2):

(2) R—N—($CH_2CH_2COOY$)$_2$ wherein:

R is a $C_6$-$C_{22}$ alkyl, alkenyl, hydroxyalkyl or hydroxyalkenyl and

Y is an agronomically acceptable cation.

5. The pesticide composition of claim 1, comprising sodium cociminodipropionate or sodium 2-ethylhexyliminodipropionate.

6. The pesticide composition of claim 5, comprising sodium 2-ethylhexyliminodipropionate.

7. The pesticide composition of claim 1, wherein the weight ratio of said at least one alkyl ether sulfate to said iminodipropionate ranges from 95:5 to 10:90.

8. The pesticide composition of claim 1, further comprising a liquid carrier.

9. The pesticide composition of claim 8, comprising at least 20 pbw of water, relative to the total weight of the composition.

10. The pesticide composition of claim 1, comprising less than 30 pbw, of any additional surfactant, relative to the total weight of the composition.

11. The pesticide composition of claim 1, wherein said pesticide comprises an ammonium salt of glufosinate.

12. The pesticide composition of claim 1, wherein the at least one alkyl ether sulfate surfactant is an alkyl ether sulfate of formula (3):

$$R'—[O—CH(R'')—CH_2]_m—O—S(O)_3^-X^+ \quad (3)$$

wherein:

R' is an alkyl, each R" is independently H or methyl, m is an integer from 1 to 100, and $X^+$ is an agronomically acceptable cation.

13. The pesticide composition of claim 12, wherein the at least one alkyl ether sulfate surfactant is sodium lauryl ether sulfate.

14. The pesticide composition of claim 12, wherein m is an integer from 1 to 50.

15. The pesticide composition of claim 1, wherein the composition comprises a combined amount of the at least one alkyl ether sulfate and the one iminodipropionate of greater than 30 wt % based on the total weight of the composition.

16. The pesticide composition of claim 1, wherein the composition comprises from b) 10 to 30 pbw of the at least one alkyl ether sulfate surfactant and c) from 5 to 30 pbw of the one iminodipropionate.

17. The pesticide composition of claim 1, further comprising from 1 to 20 pbw, relative to the total weight of the composition, of polar organic solvent.

18. A method of enhancing the efficacy of a pesticide composition comprising at least one pesticide, said method comprising adding at least one iminodipropionate to a pesticide composition containing an effective amount of a pesticide and at least one alkyl ether sulfate surfactant to form the pesticide composition of claim 1.

* * * * *